(12) United States Patent
Zhou

(10) Patent No.: US 10,798,056 B2
(45) Date of Patent: Oct. 6, 2020

(54) METHOD AND DEVICE FOR PROCESSING SHORT LINK, AND SHORT LINK SERVER

(71) Applicant: Alibaba Group Holding Limited, George Town (KY)

(72) Inventor: Jun Zhou, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 77 days.

(21) Appl. No.: 16/019,897

(22) Filed: Jun. 27, 2018

(65) Prior Publication Data

US 2018/0307774 A1 Oct. 25, 2018

Related U.S. Application Data

(63) Continuation of application No. PCT/CN2016/110703, filed on Dec. 19, 2016.

(30) Foreign Application Priority Data

Dec. 30, 2015 (CN) .......................... 2015 1 1025079

(51) Int. Cl.
*H04L 29/12* (2006.01)
*G06F 16/242* (2019.01)
(Continued)

(52) U.S. Cl.
CPC .......... *H04L 61/6072* (2013.01); *G06F 16/00* (2019.01); *G06F 16/2425* (2019.01);
(Continued)

(58) Field of Classification Search
CPC ............... G06F 16/2425; G06F 16/958; G06F 16/9562; G06F 16/00; H04L 29/06; H04L 61/6072
See application file for complete search history.

(56) References Cited

U.S. PATENT DOCUMENTS 6,957,224 B1 10/2005 Megiddo et al.
8,281,232 B2 * 10/2012 Vishria ............... G06F 16/9566
715/208
(Continued)

FOREIGN PATENT DOCUMENTS

CN 102333082 1/2012
CN 103246659 8/2013
(Continued)

OTHER PUBLICATIONS

WillMaster.com. "Short URL v2", publicly posted and retrieved by archive.org on May 9, 2015, 8 pages. (Year: 2015).*
(Continued)

*Primary Examiner* — George C Neurauter, Jr.
(74) *Attorney, Agent, or Firm* — Fish & Richardson P.C.

(57) ABSTRACT

Techniques for navigating webpages requested through short links are provided. In some implementations, a short link uniform resource locator (URL) is received, the short link URL is processed to extract a simplified short link and an address code, and a determination is made as to whether the simplified short link is associated with a long link URL representing an address of a webpage. In response to determining that the simplified short link is associated with a long link URL, the associated long link URL is provided. In response to determining that the simplified short link is not associated with a long link URL, a common long link URL associated with the address code is provided.

20 Claims, 10 Drawing Sheets

(51) Int. Cl.
*H04L 29/06* (2006.01)
*G06F 16/00* (2019.01)
*G06F 16/958* (2019.01)
*G06F 16/955* (2019.01)

(52) U.S. Cl.
CPC ........ *G06F 16/958* (2019.01); *G06F 16/9562* (2019.01); *H04L 29/06* (2013.01)

(56) References Cited

U.S. PATENT DOCUMENTS

| | | | |
|---|---|---|---|
| 8,499,099 | B1 | 7/2013 | Kogan |
| 8,510,368 | B2* | 8/2013 | Chor ................. H04L 67/02 709/201 |
| 8,630,200 | B2 | 1/2014 | St. Jean et al. |
| 8,819,168 | B2* | 8/2014 | Portnoy ............ G06F 16/9566 709/217 |
| 9,058,490 | B1* | 6/2015 | Barker ................ G06F 21/564 |
| 9,411,900 | B2* | 8/2016 | Vishria ............. G06F 16/9566 |
| 9,544,355 | B2* | 1/2017 | Cai ..................... H04L 67/02 |
| 9,582,592 | B2* | 2/2017 | Mason ............... G06F 17/2247 |
| 9,619,811 | B2* | 4/2017 | Mason ................. G06Q 50/01 |
| 10,298,654 | B2* | 5/2019 | V .......................... H04L 67/02 |
| 10,387,903 | B2* | 8/2019 | Georgoff ............ G06Q 30/0207 |
| 10,437,907 | B2* | 10/2019 | Portnoy ............ G06F 16/9566 |
| 10,475,059 | B2* | 11/2019 | Stewart ................ G06Q 50/01 |
| 10,504,192 | B2* | 12/2019 | Mason ................. G06Q 50/01 |
| 2006/0015573 | A1* | 1/2006 | Hurst-Hiller ........... H04L 67/16 709/218 |
| 2006/0294052 | A1* | 12/2006 | Kulkarni ............... G06F 16/951 |
| 2007/0136279 | A1* | 6/2007 | Zhou ................. G06F 16/9566 |
| 2008/0263193 | A1* | 10/2008 | Chalemin ........... G06F 16/9566 709/224 |
| 2011/0295990 | A1* | 12/2011 | St. Jean .............. G06F 16/9566 709/223 |
| 2013/0159826 | A1 | 6/2013 | Mason et al. |
| 2013/0325919 | A1* | 12/2013 | Carter ................ G06F 16/9566 709/201 |
| 2014/0143337 | A1* | 5/2014 | McIntosh ................ H04L 67/02 709/204 |
| 2014/0280919 | A1* | 9/2014 | Lakes ................. G06Q 30/0601 709/224 |
| 2015/0025981 | A1* | 1/2015 | Zaretsky ............. G06F 16/9566 705/14.73 |
| 2015/0156162 | A1* | 6/2015 | Kaliski, Jr. ........... G06F 16/245 709/203 |
| 2015/0161282 | A1* | 6/2015 | Low .................... G06F 16/9566 709/203 |
| 2015/0264105 | A1* | 9/2015 | V ............................ H04L 67/02 709/201 |
| 2015/0302456 | A1* | 10/2015 | Rego .................. G06Q 30/0235 705/14.35 |
| 2016/0248837 | A1* | 8/2016 | Cai ......................... H04L 67/02 |
| 2016/0308936 | A1* | 10/2016 | Yuan ...................... H04L 63/10 |
| 2017/0013070 | A1* | 1/2017 | Comstock .............. H04L 67/22 |
| 2018/0307773 | A1* | 10/2018 | Zhou ................... G06F 16/2425 |
| 2019/0280916 | A1* | 9/2019 | Lakes ................. H04L 67/2814 |

FOREIGN PATENT DOCUMENTS

| | | |
|---|---|---|
| CN | 103631926 | 3/2014 |
| CN | 103905424 | 7/2014 |
| CN | 104601736 | 5/2015 |
| CN | 104994183 | 10/2015 |
| CN | 102810089 | 12/2015 |
| JP | 2004185286 | 7/2004 |
| JP | 2004206406 | 7/2004 |
| JP | 2012164184 | 8/2012 |
| KR | 20010031603 | 4/2001 |
| WO | WO 2014112727 | 7/2014 |
| WO | 2015062491 | 5/2015 |

OTHER PUBLICATIONS

WillMaster.com. "Short URL v2—User Manual: Aliases and Campaigns", publicly posted and retrieved by archive.org on Mar. 3, 2015 2015, 2 pages. (Year: 2015).*

John Hughes. "How to Set Up Link Expiration in Pretty Links", Aug. 18, 2017, 7 pages. (Year: 2017).*

Slan Lloyd. "The Entire History of URL Shorteners", Rebrandly Blog, originally posted Aug. 18, 2016, 21 pages. (Year: 2016).*

Extended European Search Report issued in EP Application No. 16880995.2 dated Aug. 21, 2018; 8 pages.

"122.15.156.143: ""URL shortening"", Dec. 24, 2015 (Dec. 24, 2015),XP055499111, Retrieved from the Internet: URL:https://en.wikipedia.org/w/index.php?title=URL_shortening&oldid=696620607".

"Battybot: ""URL redirection"", Dec. 29, 2015 (Dec. 29, 2015),XP055499274, Retrieved from the Internet:URL: https://en.wikipedia.org/w/index.php?title=URL_redirection&oldid=697217757".

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

International Search Report by the International Searching Authority issued in International Application No. PCT/CN2016/110703 dated Mar. 21, 2017, 9 pages.

* cited by examiner

METHOD AND DEVICE FOR PROCESSING SHORT LINK, AND SHORT LINK SERVER

This application is a continuation of PCT Application No. PCT/CN2016/110703, filed on Dec. 19, 2016, which claims priority to Chinese Patent Application No. 201511025079.4, filed on Dec. 30, 2015, and each application is hereby incorporated by reference in its entirety.

TECHNICAL FIELD

The present disclosure relates to the field of Internet technologies, and in particular, to methods and devices for processing short link, and short link server.

BACKGROUND

A short link is a short uniform resource locator (URL) string that is obtained by converting a long URL through program calculation, etc., so as to save character space.

Conventionally, a short link server can jump to a corresponding real long URL based on an accessed short link URL. If the accessed short link URL does not exist or has expired, the short link server can jump to a corresponding common URL. However, the common URL needs to occupy a plurality of domain names for implementation. Consequently, the management complexity increases, and the real-time performance decreases.

SUMMARY

The present disclosure provides a method and device for processing short links, and short link servers to resolve the problem that a conventional common URL needs to occupy a plurality of domain names for implementation. Consequently, the management complexity increases, and the real-time performance decreases.

According to a first aspect of the implementations of the present disclosure, a method for processing a short link is provided, where the method includes: receiving a short link access request from a requester, where the access request includes a first short link URL; extracting a first simplified short link and a first specified URL code from the first short link URL; and obtaining a corresponding specified URL based on the first specified URL code and jumping to the specified URL, if the first simplified short link is not found in a database or when a validity period of the found first simplified short link has expired.

According to a second aspect of the implementations of the present disclosure, a device for processing a short link is provided, where the device includes: a first receiving unit, configured to receive a short link access request from a requester, where the access request includes a first short link URL; an extraction unit, configured to extract a first simplified short link and a first specified URL code from the first short link URL; and a first processing unit, configured to obtain a corresponding specified URL based on the first specified URL code and jump to the specified URL, if the first simplified short link is not found in a database or when a validity period of the found first simplified short link has expired.

According to a third aspect of the implementations of the present disclosure, a short link server is provided, where the server includes: a processor that can execute instructions stored in memory, where the processor is configured to: receive a short link access request from a requester, where the access request includes a first short link URL; extract a first simplified short link and a first specified URL code from the first short link URL; and obtain a corresponding specified URL based on the first specified URL code and jump to the specified URL, if the first simplified short link is not found in a database or when a validity period of the found first simplified short link has expired.

By using the implementations of the present disclosure, the short link access request is received from the requester. The first simplified short link and the first specified URL code are extracted from the first short link URL. If the first simplified short link is not found in the database or when the validity period of the found first simplified short link has expired, the corresponding specified URL is obtained based on the first specified URL code and the specified URL is jumped to, so that the short link server can jump to different customized URLs based on different specified URL codes. As such, under the premise of the same domain name, different specified URL codes can be mapped to different specified URLs, thereby improving flexibility of short link processing and saving storage space.

DESCRIPTION OF EMBODIMENTS

Example implementations are described in detail here, and examples of the implementations are presented in the accompanying drawings. When the following description relates to the accompanying drawings, unless specified otherwise, same numbers in different accompanying drawings represent the same element or similar elements. Implementations described in the following example implementations do not represent all implementations consistent with the present disclosure. On the contrary, they are only examples of devices and methods that are described in the appended claims in detail and that are consistent with some aspects of the present disclosure.

The terms used in the present disclosure are merely used for illustrating implementations, and are not intended to limit the present disclosure. The terms "a", "said", and "the" of singular forms used in the present disclosure and the appended claims are also intended to include plural forms, unless otherwise specified in the context. It should also be understood that, the term "and/or" used here indicates and includes any or all possible combinations of one or more associated listed items.

It should be understood that although the terms "first", "second", "third", etc. can be used in the present disclosure to describe various information, the information is not limited by the terms. These terms are only used to differentiate information of the same type. For example, without departing from the scope of the present disclosure, first information can also be referred to as second information, and similarly the second information can also be referred to as the first information. Depending on the context, for example, the word "if" used here can be explained as "while" or "when" or "in response to determining".

Figure 1:
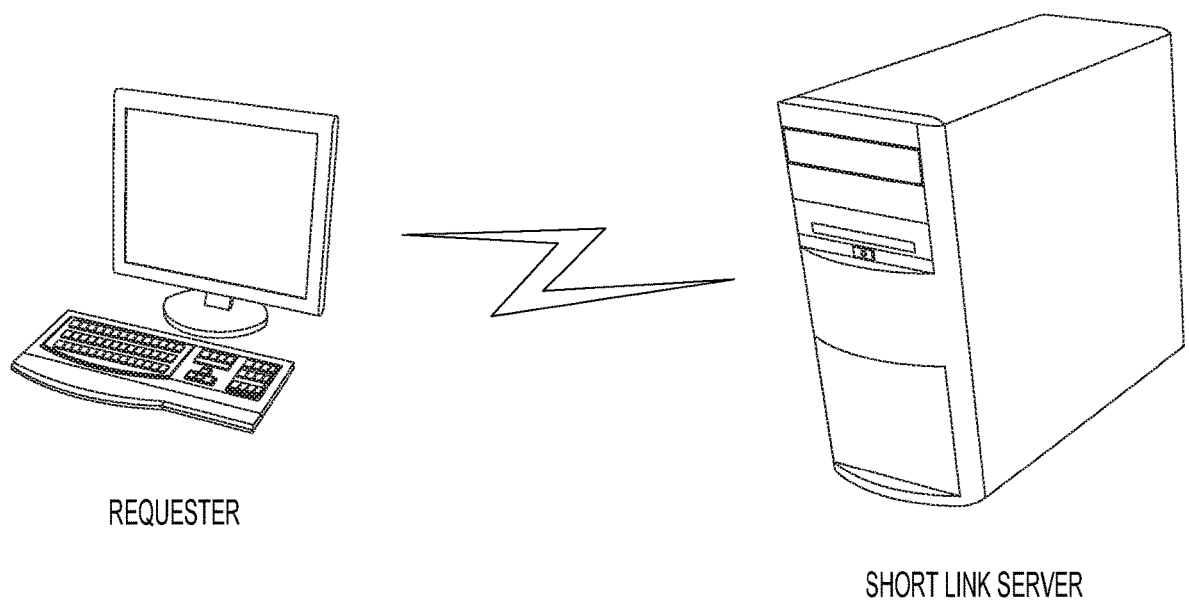
FIG. 1 is a schematic diagram illustrating a short link processing scenario according to an implementation of the present disclosure.

Referring to FIG. 1, FIG. 1 is a schematic diagram illustrating a short link processing scenario according to an implementation of the present disclosure. The scenario in FIG. 1 includes a requester and a short link server.

The requester in the scenario in FIG. 1 can initiate a short link application request or a short link access request. In addition, the requester can be a system end device, a terminal device of a common user, a device of a partner, etc. Terminal devices of the common user can include various smart phones, tablet computers, personal computers (PCs), etc.

The short link server in the scenario in FIG. 1 can be a single large-capacity server, and the large-capacity server can include a plurality of databases. Alternatively, the short link server can be a distributed cluster server, the distributed cluster server can include a plurality of servers, and each server can process a short link application request or a short link access request from the requester. Each server in the distributed cluster server can include one or more databases.

The requester can send a short link application request (also referred to herein as "the application request") to the short link server. The application request includes a long URL, and the long URL can be an actual URL to be converted. The purpose of the application request is to enable the short link server to return a corresponding short link URL.

In some implementations, the requester can send a short link access request (also referred to herein as "the access request") to the short link server, and the access request includes a short link URL. The purpose of the access request is to enable the short link server to obtain a corresponding long URL based on the short link URL and jump to the long URL. For example, when the short link URL is https://m.alipay.com/t9Yv3MZ, the corresponding long URL obtained by the short link server based on the short link URL can be https://cmspromo.alipay.com/finance/fullyear.htm.

For ease of description, the "long URL" is defined as a "long link URL" in this implementation of the present disclosure, and the definition is applicable to all the following implementations of the present disclosure. The following describes the implementations of the present disclosure in detail.

Figure 2:
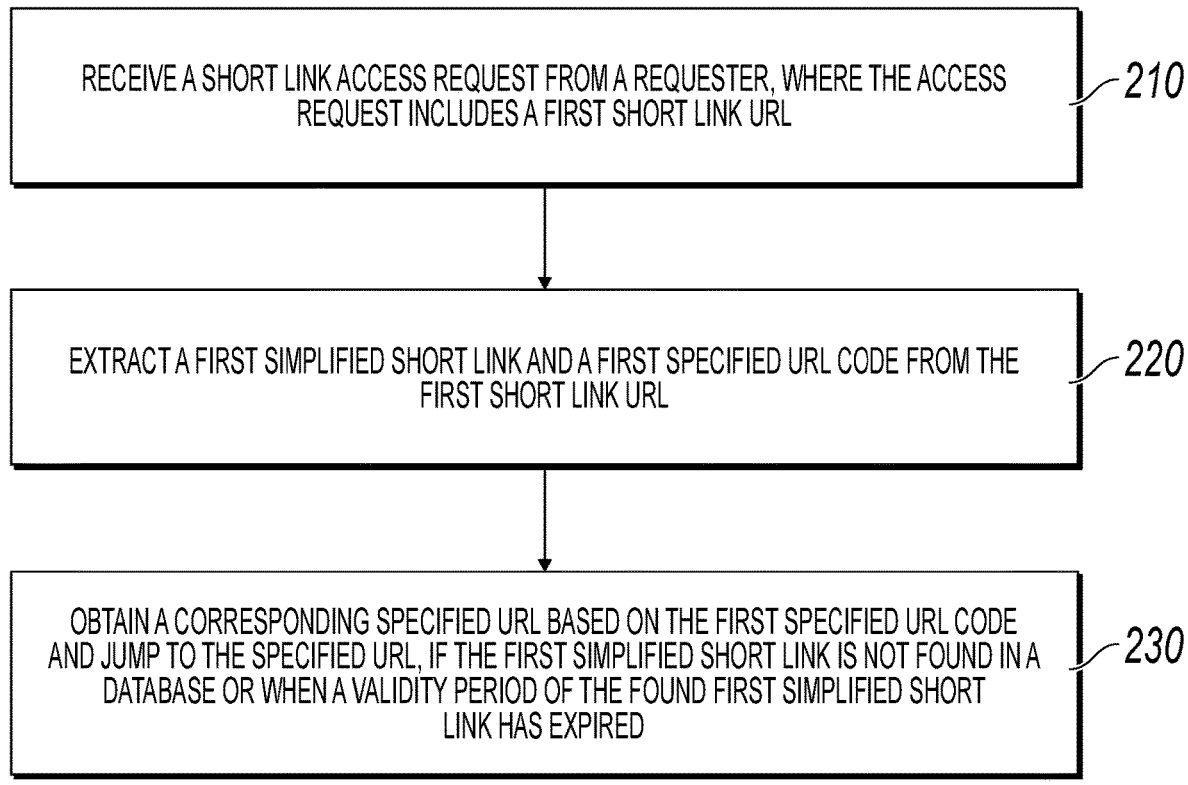
FIG. 2 is a flowchart illustrating an implementation of a method for processing a short link according to the present disclosure.

Referring to FIG. 2, FIG. 2 is a flowchart illustrating an implementation of a method for processing a short link according to the present disclosure. The method can be applied to a short link server, and includes the steps below.

Step 210: Receive a short link access request from a requester, where the access request includes a first short link URL.

In this implementation of the present disclosure, the short link server can receive the short link access request from the requester. The purpose of the access request is to enable the requester to obtain a corresponding long link URL. The first short link URL included in the access request can include not only the first simplified short link but also the first specified URL code. In addition, under the premise of the same domain name, different specified URL codes can be mapped to different specified URLs, and different specified URLs can represent different service scenarios.

For example, the first short link URL can be https://m.alipay.com/x7Yv3MZ.L. Here, m.alipay.com is a domain name, x7Yv3MZ is the first simplified short link, and L is the first specified URL code.

Step 220: Extract a first simplified short link and a first specified URL code from the first short link URL.

In this implementation of the present disclosure, the first specified URL code is used to represent a mapping code of a customized URL. When an accessed short link URL does not exist or has expired, the customized URL is jumped to. For example, the first short link URL is https://m.alipay.com/x7Yv3MZ.L.

Based on a pre-determined generation rule of a short link URL, it is determined that x7Yv3MZ is the first simplified short link, and that L is the first specified URL code.

In addition, if the first specified URL code is not included in the first short link URL, it indicates that the first specified URL code that corresponds to the first short link URL is null.

Step 230: Obtain a corresponding specified URL based on the first specified URL code and jump to the specified URL, if the first simplified short link is not found in a database or when a validity period of the found first simplified short link has expired.

In this implementation of the present disclosure, the database stores records of different short links, and the records include a corresponding simplified short link and a corresponding validity period. After receiving the short link access request, the short link server can query the database for the corresponding simplified short link. For example, the first short link URL is https://m.alipay.com/x7Yv3MZ.L.

When x7Yv3MZ is not found in the database, or a validity period of the found x7Yv3MZ has expired, a specified URL that corresponds to L can be used as a long link URL to be converted, and the specified URL is jumped to.

In the case that the first simplified short link is found in the database, and the validity period of the first simplified short link has not expired, a first long link URL that corresponds to the first simplified short link is obtained from the database, and the first long link URL is jumped to. For example, the first short link URL is https://m.alipay.com/x7Yv3MZ.L.

Here, if x7Yv3MZ is found in the database, and the validity period of the found x7Yv3MZ has not expired. In this case, a long link URL that corresponds to x7Yv3MZ can be obtained from the database, and the long link URL is jumped to.

It can be seen from the above implementation that, the short link access request is received from the requester; the first simplified short link and the first specified URL code are extracted from the first short link URL; and the corresponding specified URL is obtained based on the first specified URL code and the specified URL is jumped to, if the first simplified short link is not found in the database or when the validity period of the found first simplified short link has expired. The short link server can jump to different customized URLs based on different specified URL codes. As such, under the premise of the same domain name, different specified URL codes can be mapped to different specified URLs, thereby improving flexibility of short link processing and saving storage space.

Figure 3:
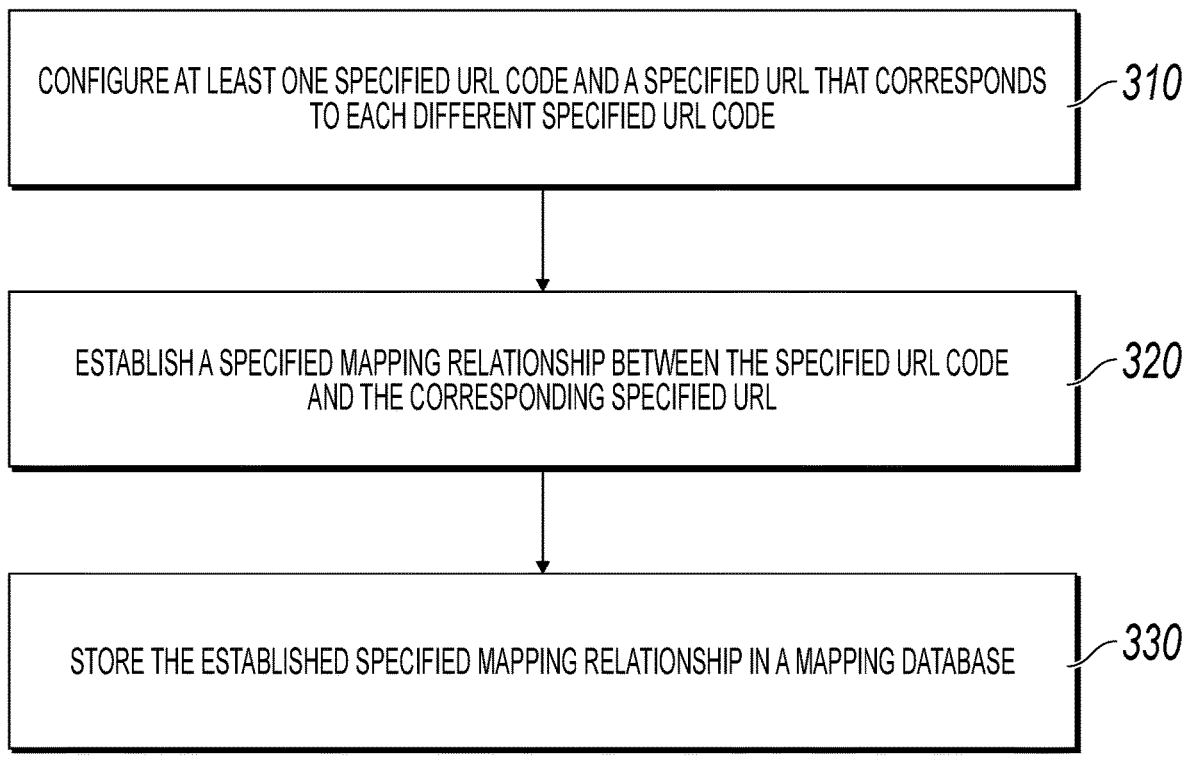
FIG. 3 is a flowchart illustrating an implementation of a method for processing a short link according to the present disclosure.

Referring to FIG. 3, FIG. 3 is a flowchart illustrating an implementation of a method for processing a short link according to the present disclosure. The method can be applied to a short link server, and is based on the method shown in FIG. 2. The method can further include the steps below.

Step 310: Configure at least one specified URL code and a specified URL that corresponds to each different specified URL code.

Step 320: Establish a specified mapping relationship between the specified URL code and the corresponding specified URL.

Step 330: Store the established specified mapping relationship in a mapping database.

For example, in the mapping database, a specified mapping relationship between each specified URL code and a corresponding specified URL is stored in a form of a table, as shown in Table 1.

TABLE 1

| Specified URL code | Specified URL | Description |
| --- | --- | --- |
| L | http://d.antfortune.com | Ant Fortune default download page |
| Z | https://zhaocaibao.alipay.com/pf/productList.htm | Zhaocaibao homepage |

The specified URL configuration can be managed by using a distributed resource management (DRM) system or a database. In addition, the short link server can support an online dynamic configuration of the specified URL that corresponds to each different specified URL code.

It can be seen from the above implementation that, the at least one specified URL code and the specified URL that corresponds to each different specified URL code can be configured in the mapping database, so that when the accessed short link URL does not exist or has expired, the specified URL code in the accessed short link URL can be quickly mapped to the corresponding specified URL. As such, a short link processing speed can be increased, and mapping data in the mapping database can be changed in real time, thereby ensuring a short-link processing accuracy rate.

Figure 4:
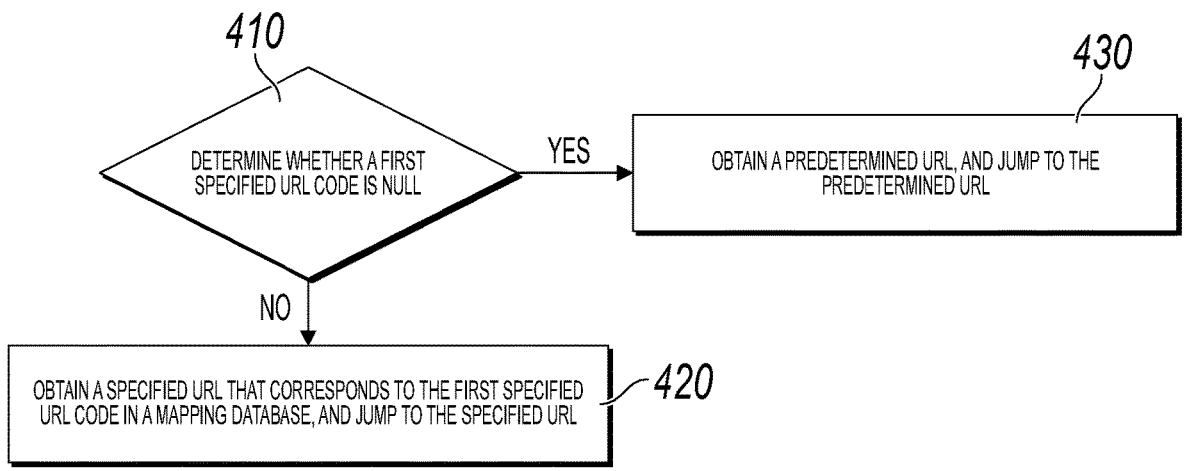
FIG. 4 is a flowchart illustrating an implementation of a method for processing a short link according to the present disclosure.

Referring to FIG. 4, FIG. 4 is a flowchart illustrating an implementation of a method for processing a short link according to the present disclosure. The method can be applied to a short link server, and is based on the method shown in FIG. 3. For example, when step 230 of obtaining the corresponding specified URL based on the first specified URL code, and jumping to the specified URL is performed, the method can include the steps below.

Step 410: Determine whether the first specified URL code is null; and if the first specified URL code is not null, perform step 420, or if the first specified URL code is null, perform step 430. For example, the first short link URL can be https://m.alipay.com/x7Yv3MZ.L. Based on a predetermined generation rule of a short link URL, it is determined that x7Yv3MZ is the first simplified short link, and that L is the first specified URL code of this example first short link URL. In this case, the first specified URL code is not null. As another example, the first short link URL can be https://m.alipay.com/x7Yv3MZ. Based on the predetermined generation rule of a short link URL, it can be determined that x7Yv3MZ is the first simplified short link, and that the first specified URL code is null.

Step 420: Obtain a specified URL that corresponds to the first specified URL code in the mapping database, and jump to the specified URL. The specified URL is a customized default URL.

For example, a specified URL that corresponds to L is obtained from the mapping database shown in Table 1, and the specified URL is jumped to. The specified URL is http://d.antfortune.com.

Step 430: Obtain a predetermined URL, and jump to the predetermined URL. The predetermined URL is a common default URL.

For example, the obtained predetermined URL is https://mobile.alipay.com/index.htm, and the predetermined URL is jumped to.

It can be seen from the above implementation that, if the first specified URL code is not null, the specified URL that corresponds to the first specified URL code can be obtained from the mapping database, and the specified URL can be jumped to; or if the first specified URL code is null, the predetermined URL can be obtained, and the predetermined URL can be jumped to. As such, different short link processing requirements can be satisfied, and the short link processing speed can be increased.

Figure 5:
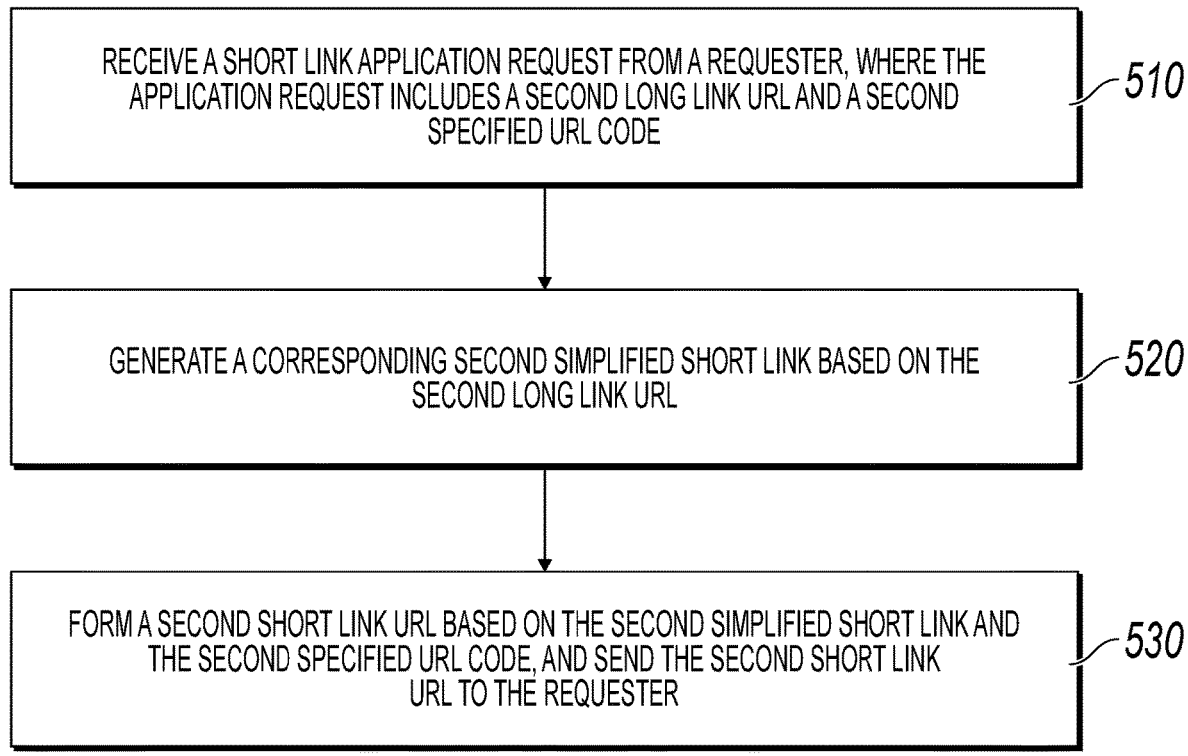
FIG. 5 is a flowchart illustrating an implementation of a method for processing a short link according to the present disclosure.

Referring to FIG. 5, FIG. 5 is a flowchart illustrating an implementation of a method for processing a short link according to the present disclosure. The method can be applied to a short link server, and is based on any one of the methods shown in FIG. 2 to FIG. 4. The method can further include the steps below.

Step 510: Receive a short link application request from a requester, where the application request includes a second long link URL and a second specified URL code. The second specified URL code is used to represent a mapping code of a customized URL. When an accessed short link URL does not exist or has expired, the customized URL can be jumped to.

In this implementation of the present disclosure, the application request received by the short link server can include a plurality of request parameters.

For example, the application request can include an actual URL to be converted (that is, the second long link URL), a validity period of the short link (that is, a specified validity period of the short link), and a default URL code (that is, the second specified URL code), as shown in Table 1.

TABLE 1

| Parameter name | Parameter description | Example |
| --- | --- | --- |
| targetUrl | Actual URL to be converted | https://cmspromo.alipay.com/finance/fullyear.htm |
| validDate | Validity period of the short link | 30 days |
| defaultUrlCode | Default URL code, which can be null. | L |

The second specified URL code can be any visible character, and can be one or more characters. For example, the second specified URL code in the example URL shown in Table 1 is L.

Step 520: Generate a corresponding second simplified short link based on the second long link URL.

In this implementation of the present disclosure, there are many methods for generating the corresponding second simplified short link based on the second long link URL, including but not limited to the following methods:

(1) A random simplified short link with a specified number of brevity code digits is generated based on the second long link URL.

The specified number of brevity code digits is set by the short link server based on an actual situation. For example, the second long link URL is https://cmspromo.alipay.com/finance/fullyear.htm. The random simplified short link is 7-digit x7Yv3MZ based on the first long link URL.

(2) The database is queried for the random simplified short link, to ensure that a newly generated random simplified short link is unused.

(3) If the random simplified short link is not found in the database, it indicates that the random simplified short link is unused, and the generated random simplified short link can be determined as the second simplified short link that corresponds to the second long link URL.

(4) If the random simplified short link is found in the database, it indicates that the random simplified short link is used, another random simplified short link needs to be generated until the another random simplified short link is not found in the database, and the another random simplified short link is determined as the second simplified short link that corresponds to the second long link URL.

In addition, if the received application request further includes the specified validity period of the short link, the newly generated second simplified short link is stored in the database, and the validity period of the second simplified short link is set to the specified validity period in the application request.

Step 530: Form a second short link URL based on the second simplified short link and the second specified URL code, and send the second short link URL to the requester.

In this implementation of the present disclosure, the second short link URL includes not only the second simplified short link but also the second specified URL code. In addition, under the premise of the same domain name, different specified URL codes can be mapped to different specified URLs, and different specified URLs can represent different service scenarios. For example, when the second long link URL is https://cmspromo.alipay.com/finance/fullyear.htm, the formed second short link URL can be https://m.alipay.com/x7Yv3MZ.L. Here, m.alipay.com is a domain name, x7Yv3MZ is the second simplified short link, and L is the second specified URL code.

It can be seen from the above implementation that, the short link application request is received from the requester, where the application request includes the second long link URL and the second specified URL code; the second short link URL is formed based on the second simplified short link and the second specified URL code, and the second short link URL is sent to the requester, so that the short link server can provide a short link URL that includes a specified URL code. When the accessed short link URL does not exist or has expired, the specified URL code in the accessed short link URL can be quickly mapped to the corresponding specified URL, thereby increasing a short link processing speed.

Figure 6:
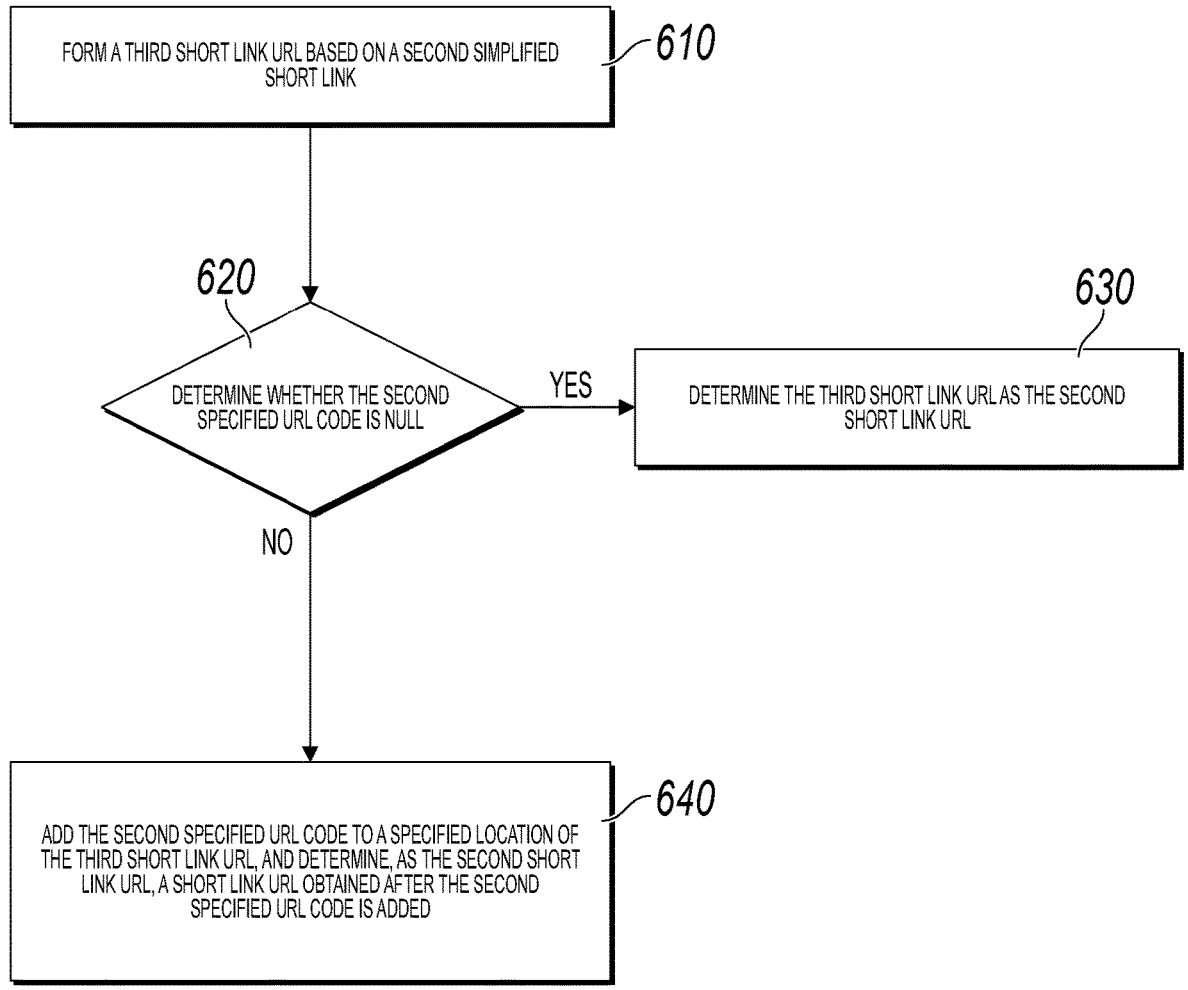
FIG. 6 is a flowchart illustrating an implementation of a method for processing a short link according to the present disclosure.

Referring to FIG. 6, FIG. 6 is a flowchart illustrating an implementation of a method for processing a short link according to the present disclosure. The method can be applied to a short link server, and can be based on the method shown in FIG. 5. For example, when step 530 of forming a second short link URL based on the second simplified short link and the second specified URL code is performed, the method can include the steps below.

Step 610: Form a third short link URL based on the second simplified short link. For example, when the second simplified short link is x7Yv3MZ, the formed third short link URL can be https://m.alipay.com/x7Yv3MZ. Here, m.alipay.com is a domain name, and x7Yv3MZ is the second simplified short link.

Step 620: Determine whether the second specified URL code is null; and if the second specified URL code is null, perform step 630, or if the second specified URL code is not null, perform step 640.

Step 630: Determine the third short link URL as the second short link URL.

Step 640: Add the second specified URL code to a specified location of the third short link URL, and determine, as the second short link URL, a short link URL obtained after the second specified URL code is added.

In this implementation of the present disclosure, the specified location can be in front of the second simplified short link or behind the second simplified short link, or can be in the Nth digit of the second simplified short link. As such, there are many methods for adding the second specified URL code to the specified location of the third short link URL, including but not limited to the following methods:

The second specified URL code is added to an end of the second simplified short link in the third short link URL, and a separator is added between the second simplified short link and the second specified URL code. The separator can be a dot or any other character. Alternatively, the separator can be directly omitted. The specified URL code can be parsed out based on the predetermined number of brevity code digits.

It can be seen from the above implementation that the second specified URL code can be added to the specified position of the third short link URL to form the short link URL that includes the specified URL code and return the short link URL to the requester, so the requester can initiate an access request based on the short link URL that includes the specified URL code. This satisfies the short link processing requirement, and extends the short link processing range.

Corresponding to the implementation of the method for processing a short link according to the present disclosure, the present disclosure further provides an implementation of a device for processing a short link.

Figure 7:
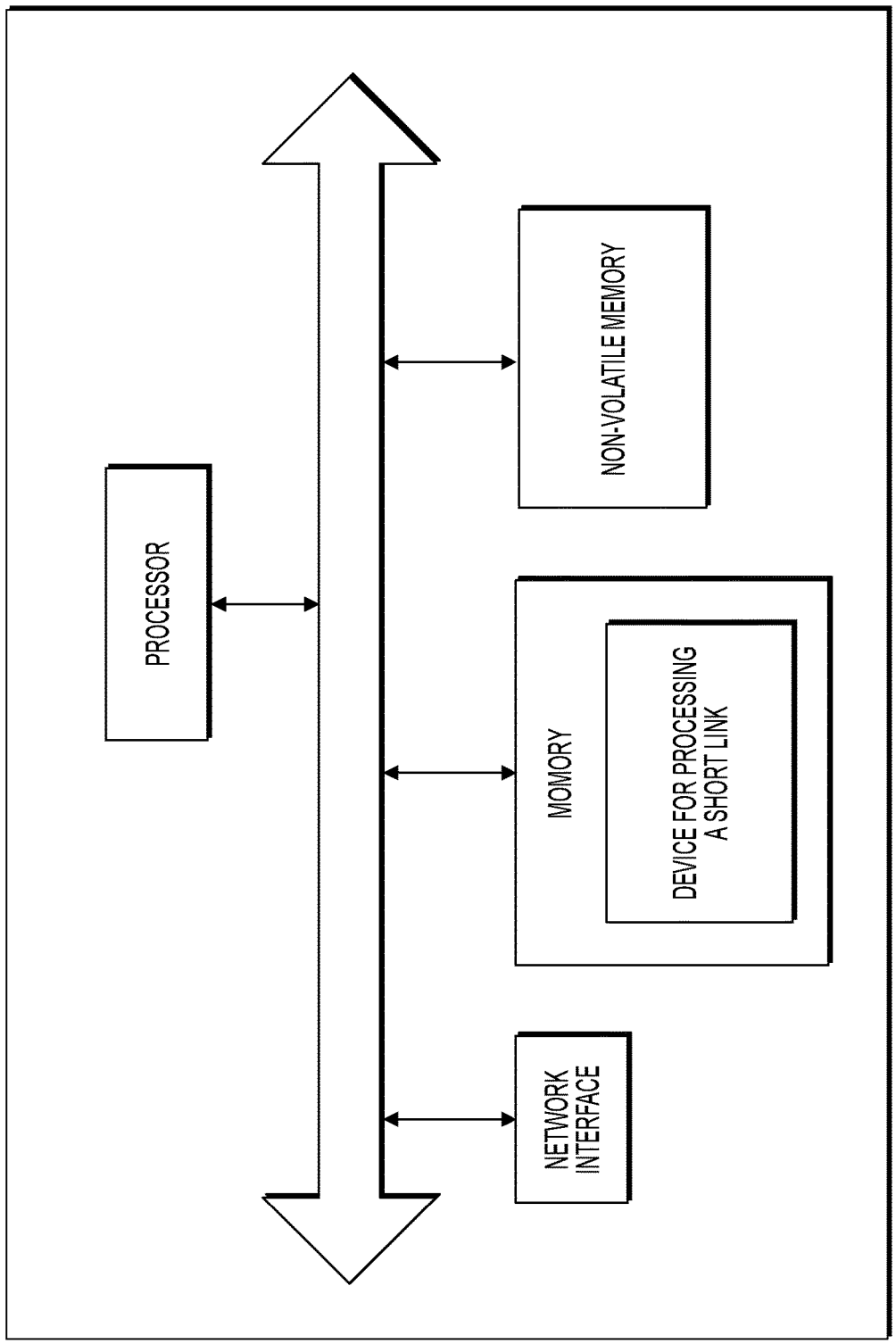
FIG. 7 is a structural diagram of hardware of a device where a device for processing a short link is located according to the present disclosure.

The implementation of the device for processing a short link according to the present disclosure can be applied to short link servers. The device implementation can be implemented by using software, hardware, or both. Software implementation is used as an example. As a logical device, the device is formed by reading a corresponding computer program instruction in a non-volatile memory to a memory by a processor of a device where the device is located. From a perspective of hardware, as shown in FIG. 7, FIG. 7 is a structural diagram of hardware of a device where the device for processing a short link in the present disclosure is located. In addition to a processor, a memory, a network interface, and a non-volatile memory shown in FIG. 7, the device where the device in this implementation is located can include other hardware based on actual functions of the device. For example, for a terminal, the device can include a camera, a touchscreen, a communications component, etc.; and for a server, the device can include a forwarding chip, etc., that is responsible for processing packets.

Figure 8:
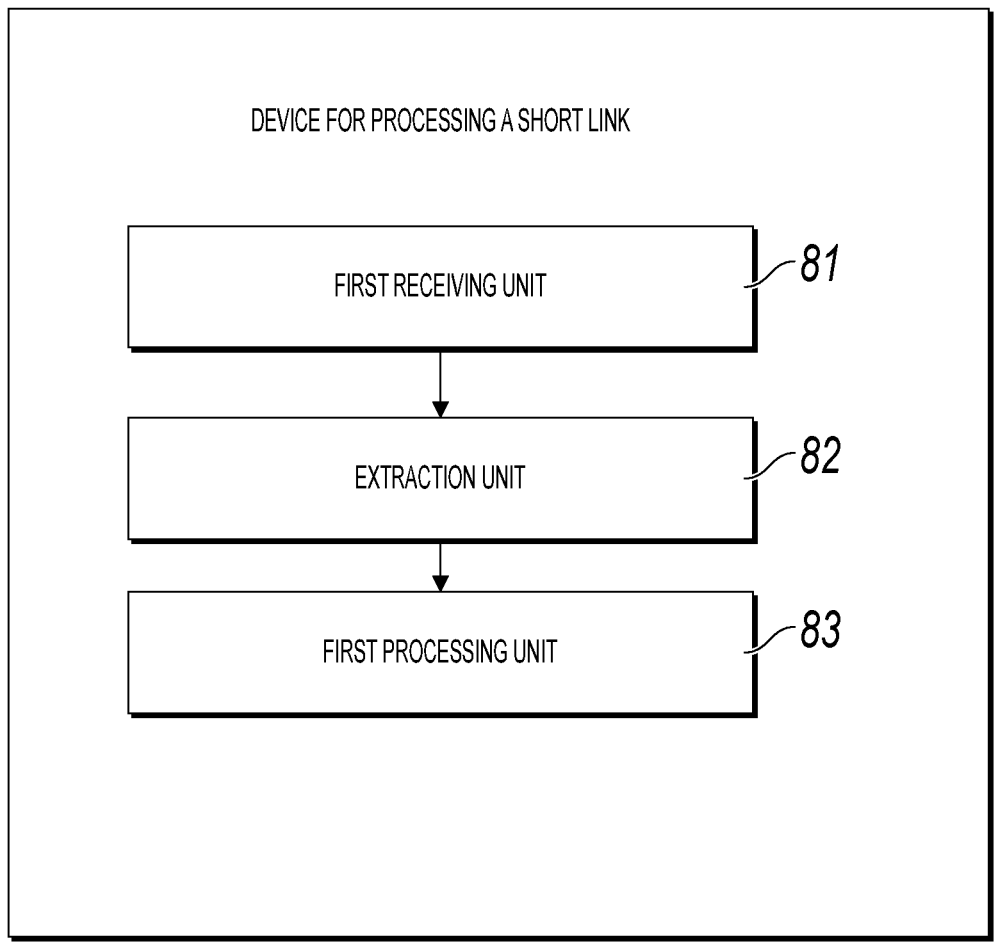
FIG. 8 is a block diagram illustrating an implementation of a device for processing a short link according to the present disclosure.

Referring to FIG. 8, FIG. 8 is a block diagram illustrating an implementation of a device for processing a short link according to the present disclosure. The device for processing a short link can be applied to a short link server, and can be configured to perform the method for processing a short link shown in the method implementation. The device includes a first receiving unit 81, an extraction unit 82, and a first processing unit 83.

The first receiving unit 81 is configured to receive a short link access request from a requester, where the access request includes a first short link URL.

The extraction unit 82 is configured to extract a first simplified short link and a first specified URL code from the first short link URL.

The first processing unit 83 is configured to obtain a corresponding specified URL based on the first specified URL code and jump to the specified URL, if the first simplified short link is not found in a database or when a validity period of the found first simplified short link has expired.

In an implementation, the device for processing a short link can further include a configuration unit, an establishment unit, and a mapping storage unit (not shown in FIG. 8).

The configuration unit is configured to configure at least one specified URL code and a specified URL that corresponds to each different specified URL code. The establishment unit is configured to establish a specified mapping relationship between the specified URL code and the specified URL. The mapping storage unit is configured to store the specified mapping relationship in a mapping database.

In some implementations, the first processing unit 83 can include a first determining subunit and a first processing subunit (not shown in FIG. 8).

The first determining subunit is configured to determine whether the first specified URL code is null. The first processing subunit is configured to obtain the specified URL that corresponds to the first specified URL code from the mapping data, and jump to the specified URL if the first specified URL code is not null.

In some implementations, the first processing unit 83 can further include a second processing subunit (not shown in FIG. 8).

The second processing subunit is configured to obtain a predetermined URL and jump to the predetermined URL if the first specified URL code is null.

In some implementations, the device for processing a short link can further include a second processing unit (not shown in FIG. 8).

The second processing unit is configured to obtain a first long link URL that corresponds to the first simplified short link from the database, and jump to the first long link URL, if the first simplified short link is found in the database and the validity period of the first simplified short link does not expire.

Figure 9:
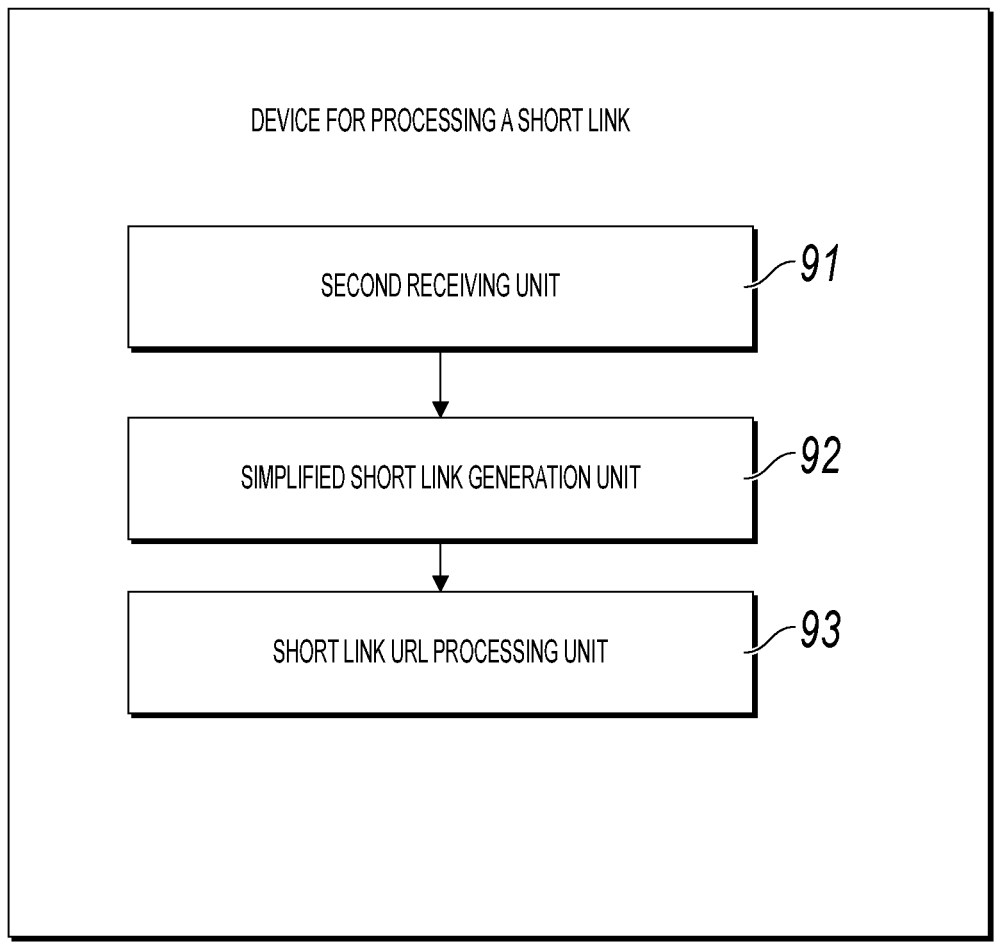
FIG. 9 is a block diagram illustrating an implementation of a device for processing a short link according to the present disclosure.

Referring to FIG. 9, FIG. 9 is a block diagram illustrating an implementation of a device for processing a short link according to the present disclosure. The device for processing a short link can be applied to a short link server, and can be based on the device shown in FIG. 8. The device includes a second receiving unit 91, a simplified short link generation unit 92, and a short link URL processing unit 93.

The second receiving unit 91 is configured to receive a short link application request from the requester, where the application request includes a second long link URL and a second specified URL code.

The simplified short link generation unit 92 is configured to generate a corresponding second simplified short link based on the second long link URL.

The short link URL processing unit 93 is configured to form a second short link URL based on the second simplified short link and the second specified URL code, and send the second short link URL to the requester.

In some implementations, the simplified short link generation unit 92 can include a generation subunit, a first simplified short link processing subunit, and a second simplified short link processing subunit (not shown in FIG. 9).

The generation subunit is configured to generate a random simplified short link with a specified number of brevity code digits based on the second long link URL.

The first simplified short link processing subunit is configured to determine the random simplified short link as the second simplified short link if the random simplified short link is not found in the database.

The second simplified short link processing subunit is configured to generate another random simplified short link until the another random simplified short link is not found in the database and determine, as the second simplified short link, the another random simplified short link that is not found, if the random simplified short link is found in the database.

In another implementation, the application request received by the second receiving unit 91 further includes a specified validity period of the short link, and the device for processing a short link can further include a simplified short link storage unit (not shown in FIG. 9).

The simplified short link storage unit is configured to store the second simplified short link in the database, and set a validity period of the second simplified short link to the specified validity period.

In another implementation, the short link URL processing unit 93 can include a generating subunit, a second determining subunit, a first determining subunit, and a second determining subunit (not shown in FIG. 9).

The generating subunit is configured to form a third short link URL based on the second simplified short link.

The second determining subunit is configured to determine whether the second specified URL code is null.

The first determining subunit is configured to determine the third short link URL as the second short link URL if the second specified URL code is null.

The second determining subunit is configured to add the second specified URL code to a specified location of the third short link URL and determine, as the second short link URL, a short link URL obtained after addition if the second specified URL code is not null.

In addition, the second determining subunit can be configured to add the second specified URL code to an end of the second simplified short link in the third short link URL and add a separator between the second simplified short link and the second specified URL code, where a short link URL obtained after addition is the second short link URL, if the second specified URL code is not null.

For a detailed implementation process of functions and roles of each unit in the device, refer to an implementation process of a corresponding step in the previous method. Details are omitted here.

A device implementation basically corresponds to a method implementation. As such, for related parts, refer to related descriptions in the method implementation. The described device implementation is merely an example. The units described as separate parts can be physically separate or not, and parts displayed as units can be physical units or not, can be located in one position, or can be distributed on a plurality of network units. Some or all of the modules can be selected based on actual requirements to achieve the objectives of the solutions of the present disclosure. A person of ordinary skill in the art can understand and implement the implementations of the present disclosure without creative efforts.

An implementation of the present disclosure further provides a short link server. The server includes: a processor that can execute instructions stored in memory.

The processor is configured to: receive a short link access request from a requester, where the access request includes a first short link URL; extract a first simplified short link and a first specified URL code from the first short link URL; and obtain a corresponding specified URL based on the first specified URL code and jump to the specified URL, if the first simplified short link is not found in a database or when a validity period of the found first simplified short link has expired.

It can be seen from the above implementation that, the short link access request is received from the requester; the first simplified short link and the first specified URL code are extracted from the first short link URL; and the corresponding specified URL is obtained based on the first specified URL code and the specified URL is jumped to, if the first simplified short link is not found in the database or when the validity period of the found first simplified short link has expired. The short link server can jump to different customized URLs based on different specified URL codes. As such, under the premise of the same domain name, different specified URL codes can be mapped to different specified URLs, thereby improving flexibility of short link processing and saving storage space.

A person skilled in the art can easily figure out another implementation solution of the present disclosure after considering the specification and practicing the present disclosure. The present disclosure is intended to cover any variations, functions, or adaptive changes of the present disclosure. These variations, functions, or adaptive changes comply with general principles of the present disclosure, and include common knowledge or a commonly used technical means in the technical field that is not disclosed in the present disclosure. The specification and the implementations are merely considered as examples, and the actual scope and the spirit of the present disclosure are described by the following claims.

It should be understood that the present disclosure is not limited to the structures that are described in the foregoing and that are shown in the accompanying drawings, and the modifications and changes can be made without departing from the scope of the present disclosure. The scope of the present disclosure is limited only by the appended claims.

Figure 10:
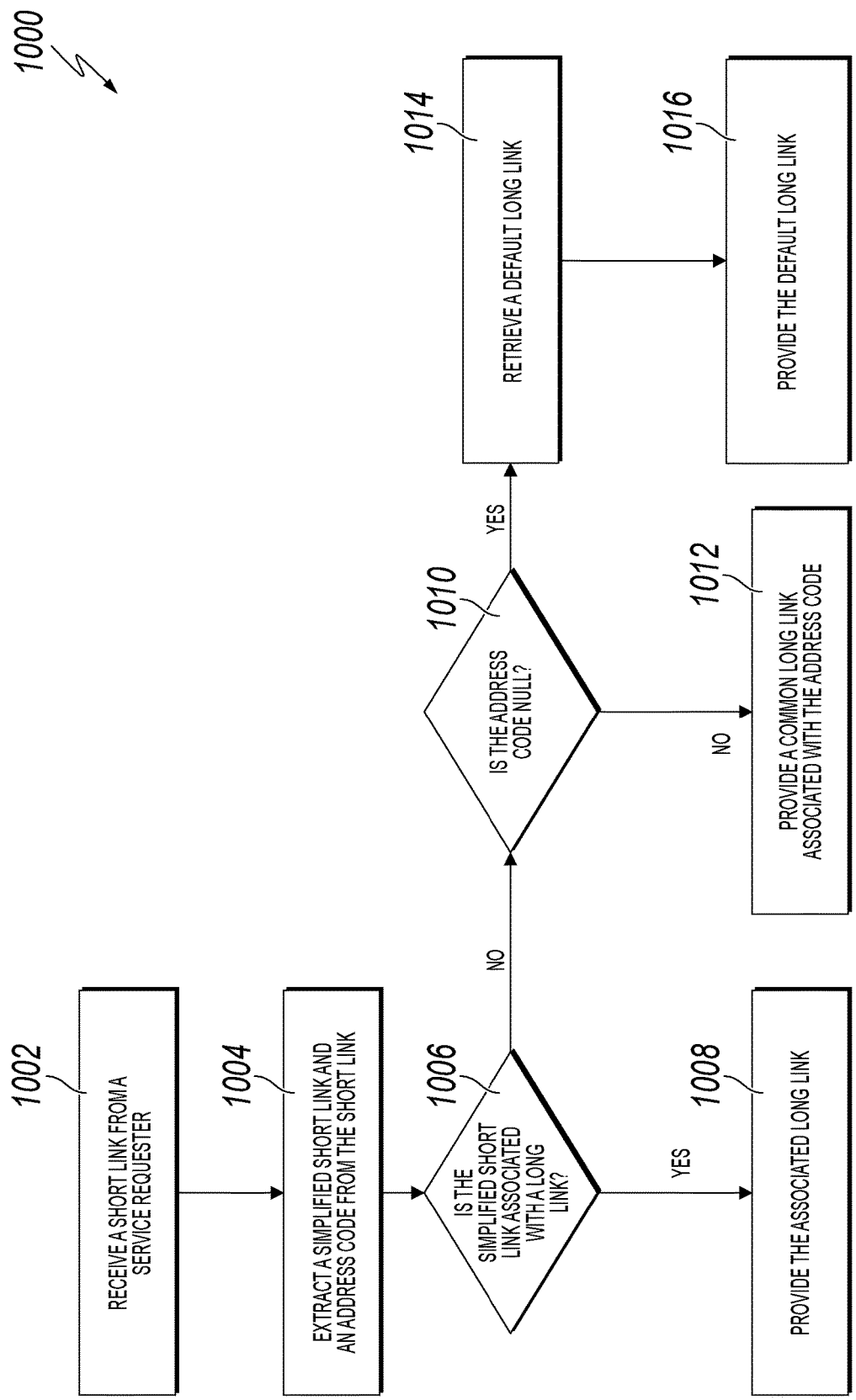
FIG. 10 is a flowchart illustrating an example of a computer-implemented method 1000 for processing short link URL, according to an implementation of the present disclosure.

FIG. 10 is a flowchart illustrating an example of a computer-implemented method 1000 for processing a short link URL, according to an implementation of the present disclosure. For clarity of presentation, the description that follows generally describes method 1000 in the context of the other figures in this description. However, it will be understood that method 1000 can be performed, for example, by any system, environment, software, and hardware, or a combination of systems, environments, software, and hardware, as appropriate. In some implementations, various steps of method 1000 can be run in parallel, in combination, in loops, or in any order.

At 1002, a short link URL is received from a service requester (or client). For example, the short link URL (also referred to as "the short link" herein) can be received at the short link server (also referred to as "the server" herein) of FIG. 1. The short link can be received from a computing device (e.g., the requester in FIG. 1), or by an application executed on a computing device. an example of the short link can be https://m.alipay.com/x7Yv3MZ.L. Receiving the short link can indicate a request for a service associated with the short link. For example, receiving the short link may indicate a request to jump to a webpage. From 1002, method 1000 proceeds to 1004.

At 1004, a simplified short link and an address code are extracted from the short link. In some implementations, the simplified short link and the address code are extracted by parsing the short link. For example, the short link https://m.alipay.com/x7Yv3MZ.L can be parsed to extract the simplified short link x7Yv3MZ and the address code L. From 1004, method 1000 proceeds to 1006.

At 1006, a determination is made as to whether the simplified short link is associated with a long link. Determining association of the simplified short link with a ling links can include consulting a database that maps one or more short links to one or more long links. Each long link is a URL of a website. Determining the association can include checking an expiration time of the short link. For example, once a simplified short link expires, the simplified short link may be deleted from the database. If it is determined that the short link is associated with a long link (e.g., an association between the short link and one or more long links is found in the database), method 1000 proceeds to 1008. Otherwise, if it is determined that the short link is not associated with a long link (e.g., the short has expired, or is not found in the database), method 1000 proceeds to 1010.

At 1008, the long link associated with the simplified short link is provided, for example, to the service requester. The associated long ling may be retrieved from the database. For example, the database may determine that the long link associated with the short link https://m.alipay.com/x7Yv3MZ.L is https://crospromo.alipay.com/finance/fully-ear.htm and provide the respective long link. To provide the long link, the server may jump to a webpage with the address of the long link, and provide data associated with the webpage to the service requester. The server may provide the long link to the service requester so that the service requester can jump to the long link.

At 1010, a determination is made as to whether the address code of the short link is null. If it is determined that the address code is null, method 1000 proceeds to 1014.

Otherwise, if it is determined that the address code is not null, method 1000 proceeds to 1012.

At 1012, a common long link associated with the address code is provided, for example, to the service requester. For example, the database may map one or more address codes to one or more common long links. Similar to the long links, the one or more common long links are URL addresses to one or more websites. In some implementations, the address codes are stored based on one or more domain identifiers. A domain identifier associated with a short link can be determined by parsing the short link. For example, the domain identifier in the short link https://m.alipay.com/x7Yv3MZ.L can be m.alipay.com. As an example, a common long link associated with the address code L and the domain identifier m.alipay.com can be https://cmspromo.alipay.com/finance. Two short links with similar address codes but different domain identifiers may be associated with two different common long links. Two short links with different address codes but the same domain identifiers may be associated with two different common long links. Two short links with the same address codes and the same domain identifier may be associated with the same common long link, even if they have different simplified short links. For example, a common long link associated with the two short links https://m.alipay.com/x7Yv3MZ.L and https://m.alipay.com/a8Zbr5C.L may be https://cmspromo.alipay.com/finance.

At 1014, a default long link is retrieved. For example, the database may have stored one or more default long links associated with null address code. The one or more default long links can be associated with one or more domain identifiers. For example, the retrieved default long link can be associated with the domain identifier included in the short ling. Similar to a long link, a default long link can be a URL address to a website. For example, when the short link is https://m.alipay.com/x7Yv3MZ, the default long link associated with the domain m.alipay.com can be https://cmspromo.alipay.com. From 1014, method 1000 proceeds to 1016.

At 1016, data associated with the default long link is provided to the service requester. The server may jump to a webpage with the address of the default long link and provide data associated with the webpage to the service requester. The server may provide the default long link to the service requester so that the service requester can jump to the webpage.

Implementations of the present disclosure can convert a long link URL (also referred to as "long link" herein) to a short link URL (also referred to as "short link" herein). A short link may have a shorter length (e.g., have less number of characters) than a long link.

In some implementations, an application request to convert a long link to a short link may be received, for example, at the server of FIG. 1. The application request can include a long link, an address code, and/or a domain identifier. The server can generate a simplified short link for the long link. The simplified short link can be a random brevity code. The random brevity code can have a predetermined length (e.g., a predetermined number of characters). For example, a simplified short link may have a predetermined length of 7 digits. The server can then form a short link URL associated with the long link, based on the simplified short link, the address code, and the domain identifier. For example, the short link URL may be formed as a sequence of characters starting with the domain identifier, followed by the simplified short link, and the address code. The address code can be located anywhere in the short link, such as before or after the simplified short link. The short link URL can be sent back to the computing device or application that had submitted the application request.

The long link can be stored in a database as a long link associated with the short link URL, the simplified short link, and/or the address code. For example, the database may include one or more long link URLs, each mapped to one or more simplified short links and/or one or more address codes. Accordingly, when a short link is received, long link associated with the short link, the simplified short link, and/or the address code of the short link can be retrieved from the database.

In some implementations, a validity period can be assigned to the simplified short link of the short link URL. Once the validity period expires, the simplified short link may expire and/or may be deleted from the database.

In some implementations, each simplified short link is unique and no two long links share the same simplified short links in the database. For example, while forming a short link URL for a first long link, when a first simplified short link is generated, a determination is made as to whether the database already includes the first simplified short link. If it is determined that the database already includes the first simplified short link and has already associated the first simplified short link to a second long link, another simplified short link is generated to replace the first simplified short link. This process continues until a unique simplified short link is generated for the first long link.

A webpage address (such as a long link URL) can be shorten or converted to a short link URL with less characters. On average, a short link takes less memory space and less network traffic compared to a corresponding long link. A database can store one or more short links and map each of the one or more short links to a long link, so that when a short link is triggered (e.g., clicked on), the long link would be retrieved to provide the corresponding webpage. Conventionally, if a short link cannot be found in the database (e.g., if the short link has expired), a common URL is provided instead of the long link that was supposed to be mapped to the short link. However, the common URL may be shared between different domains, or may have nothing in common with the requested webpage or the long link. For example, the requested webpage associated with a short link may be newsfeed.com/news/finance, while the common URL may be a default URL such as GOOGLE.com. Thus, the common URL causes complexity and reduces real-time performance in navigating to a webpage requested through a short link.

The present disclosure provides techniques to improve real-time performance and reduce complexity in navigating webpages requested through short links. Implementations of the present disclosure are particularly beneficial when a short link has expired or no longer exists in a database that maps short links to webpage addresses. The short links provided in the present disclosure can include an address code. The address to a requested webpage can be determined based on the address code even if the respective short link has expired. Each address code is stored in the database and is associated with a webpage address corresponding to the short link. With respect to the example in the preceding paragraph, an address code may be associated with the webpage newsfeed.com. Accordingly, even if a short link expires, a webpage relevant to the requested webpage can be provided based on the address code included in the short link.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method executed by one or more processors, the method comprising:
   receiving, by the one or more processors, a first short link uniform resource locator (URL) from a service requester, the first short link URL comprising a domain identifier;
   processing, by the one or more processors, the first short link URL to extract the domain identifier, a simplified short link and an address code, wherein the simplified short link is stored in a database during a validity period;
   determining, by the one or more processors, based on an expiration of the validity period that the simplified short link is inaccessible based on a missing association between the simplified short link and a long link URL representing an address of a webpage;
   in response to determining that the simplified short link is inaccessible, processing, by the one or more processors, the domain identifier and the address code to determine a common long link URL associated with the first short link URL, wherein the common long link URL is different from both the simplified short link and is different from the long link URL; and
   providing, by the one or more processors, the common long link URL associated with the address code to the service requester.

2. The computer-implemented method of claim 1, further comprising:
   consulting the database to search a mapping relationship between the first short link URL and the long link URL.

3. The computer-implemented method of claim 1, wherein the long link URL is determined based on the domain identifier.

4. The computer-implemented method of claim 3, further comprising:
   determining, by the one or more processors, that the address code is null, and in response:
      retrieving a default long link URL associated with null address code, the default long link URL being associated with the domain identifier, and
      providing the default long link URL to the service requester.

5. The computer-implemented method of claim 1, wherein the simplified short link is a first simplified short link, and the address code is a first address code, the method further comprising:
   receiving, by the one or more processors, an application request for a second short link URL from an application requester, the application request comprising a second long link URL and a second address code; and
   generating, by the one or more processors, a second simplified short link for the second long link URL, and in response:
      forming, by the one or more processors, the second short link URL based on the second simplified short link and the second address code,
      storing the second long link URL in the database by associating the second long link URL to the second simplified short link and the second address code, and
      transmitting the second short link URL to the application requester.

6. The computer-implemented method of claim 5, further comprising assigning the validity period to the second simplified short link, wherein after the validity period expires, the second simplified short link expires in the database.

7. The computer-implemented method of claim 5, wherein the second simplified short link is a random brevity code comprising a predetermined number of characters.

8. The computer-implemented method of claim 5, further comprising:
   determining that the second simplified short link is the same as a third simplified short link in the database, and the second long link URL differs from a third long link URL associated with the third simplified short link in the database;
   generating a fourth simplified short link; and
   replacing the second simplified short link with the fourth simplified short link.

9. The computer-implemented method of claim 1, wherein processing the first short link URL comprises parsing, by the one or more processors, the short link URL to extract the simplified short link and the address code.

10. The computer-implemented method of claim 5, further comprising adding a separator between the second simplified short link and the second address code.

11. The computer-implemented method of claim 2, wherein determining that the simplified short link is inaccessible comprises determining that the simplified short is not found in the database.

12. A non-transitory, computer-readable medium storing one or more instructions executable by a computer system to perform operations comprising:
   receiving a first short link uniform resource locator (URL) from a service requester, the first short link URL comprising a domain identifier;
   processing the first short link URL to extract the domain identifier, a simplified short link and an address code, wherein the simplified short link is stored in a database during a validity period;
   determining based on an expiration of the validity period that the simplified short link is inaccessible based on a missing association between the simplified short link and a long link URL representing an address of a webpage;
   in response to determining that the simplified short link is inaccessible, processing the domain identifier and the address code to determine a common long link URL associated with the first short link URL, wherein the common long link URL is different from both the simplified short link and is different from the long link URL; and
   providing the common long link URL associated with the address code to the service requester.

13. The non-transitory, computer-readable medium of claim 12, wherein the long link URL is determined based on the domain identifier.

14. The non-transitory, computer-readable medium of claim 13, further comprising one or more instructions executable to perform:
determining that the address code is null, and in response:
retrieving a default long link URL associated with null address code, the default long link URL being associated with the domain identifier, and
providing the default long link URL to the service requester.

15. The non-transitory, computer-readable medium of claim 12, wherein the simplified short link is a first simplified short link, and the address code is a first address code the operations comprise:
receiving an application request for a second short link URL from an application requester, the application request comprising a second long link URL and a second address code; and
generating a second simplified short link for the second long link URL, and in response:
forming the second short link URL based on the second simplified short link and the second address code,
storing the second long link URL in the database by associating the second long link URL to the second simplified short link and the second address code, and
transmitting the second short link URL to the application requester.

16. The non-transitory, computer-readable medium of claim 15, further comprising one or more instructions executable to perform assigning the validity period to the second simplified short link so that after the validity period expires, the second simplified short link expires in the database.

17. The non-transitory, computer-readable medium of claim 15, further comprising one or more instructions executable to perform:
determining that the second simplified short link is the same as a third simplified short link in the database, and the second long link URL differs from a third long link URL associated with the third simplified short link in the database;
generating a fourth simplified short link; and
replacing the second simplified short link with the fourth simplified short link.

18. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
receiving a first short link uniform resource locator (URL) from a service requester, the first short link URL comprising a domain identifier;
processing the first short link URL to extract the domain identifier, a simplified short link and an address code, wherein the simplified short link is stored in a database during a validity period;
determining based on an expiration of the validity period that the simplified short link is inaccessible based on a missing association between the simplified short link and a long link URL representing an address of a webpage;
in response to determining that the simplified short link is inaccessible, processing the domain identifier and the address code to determine a common long link URL associated with the first short link URL, wherein the common long link URL is different from both the simplified short link and is different from the long link URL; and
providing the common long link URL associated with the address code to the service requester.

19. The computer-implemented system of claim 18, wherein the simplified short link is a first simplified short link, and the address code is a first address code, the operations further comprising:
receiving an application request for a second short link URL from an application requester, the application request comprising a second long link URL and a second address code; and
generating a second simplified short link for the second long link URL, and in response:
forming the second short link URL based on the second simplified short link and the second address code,
storing the second long link URL in the database by associating the second long link URL to the second simplified short link and the second address code, and
transmitting the second short link URL to the application requester.

20. The computer-implemented system of claim 19, the operations further comprising one or more instructions executable to perform assigning the validity period to the second simplified short link so that after the validity period expires, the second simplified short link expires in the database.

* * * * *